Fred E. Williams
INVENTOR.

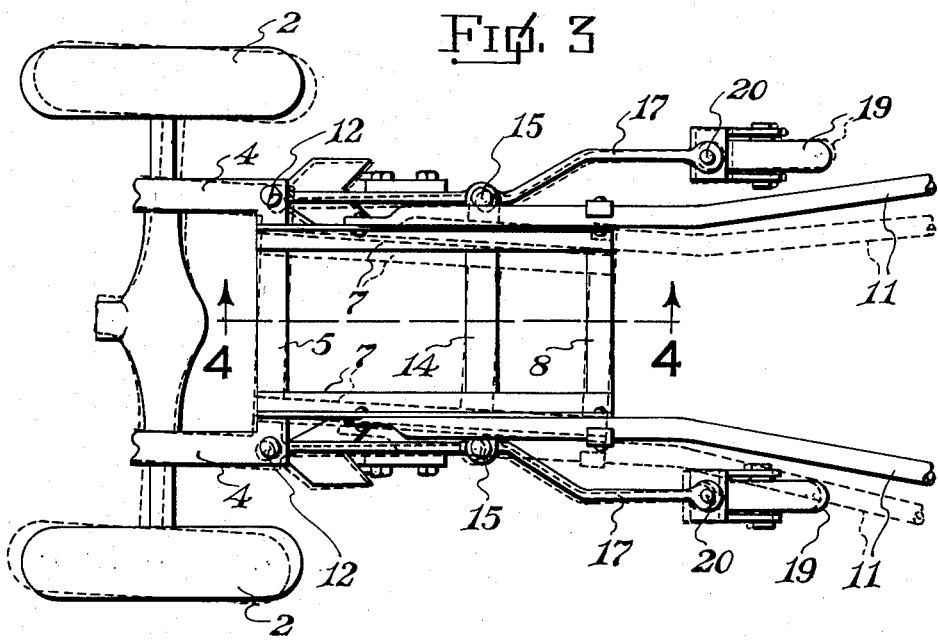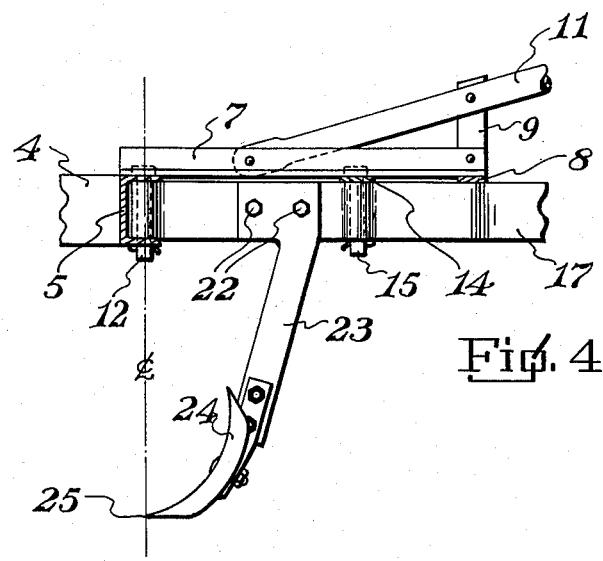

United States Patent Office 2,957,530
Patented Oct. 25, 1960

2,957,530

TRACTOR TRAILED CULTIVATOR

Fred E. Williams, 1340 N. Sheridan Road, Tulsa, Okla.

Filed Nov. 12, 1957, Ser. No. 695,563

1 Claim. (Cl. 172—256)

The invention relates to tractor trailed cultivators, particularly the garden type, and has for its object to provide a device of this kind comprising a rigid frame, rigidly and non-pivotally connected to the rear end of the tractor and having connected to the under side of said frame, adjacent the tractor, parallel cultivator beams having cultivator shovels, and the beams of the cultivator having a parallel movement in a horizontal plane, said parallel movement forming means whereby the cultivator shoes and beams will remain in substantially the same position, straddling a row, as the tractor is guided over the row and guided to the right or the left.

A further object is to provide the rear ends of the cultivator beams with ground engaging wheels for supporting the beams. It is also an object of the invention to provide the ground engaging wheels with means whereby the rear end of the cultivator beams may be adjusted upwardly or downwardly for adjusting the plowing depth, or for positioning the cultivator shovels above the ground, when transporting the device from place to place.

A further object is to position the points of the cultivator shovels substantially in alignment, vertically, with the pivotal points of the forward ends of the cultivator beams.

A further object is to provide the rigid tractor attached frame with upwardly and rearwardly extending handle members adapted to be grasped by the operator for guiding the tractor during a cultivating operation.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 3 is a top plan view of a portion of the tractor showing the device applied thereto.

Figure 4 is a vertical longitudinal sectional view taken on line 4—4 of Figure 3.

Figure 1:
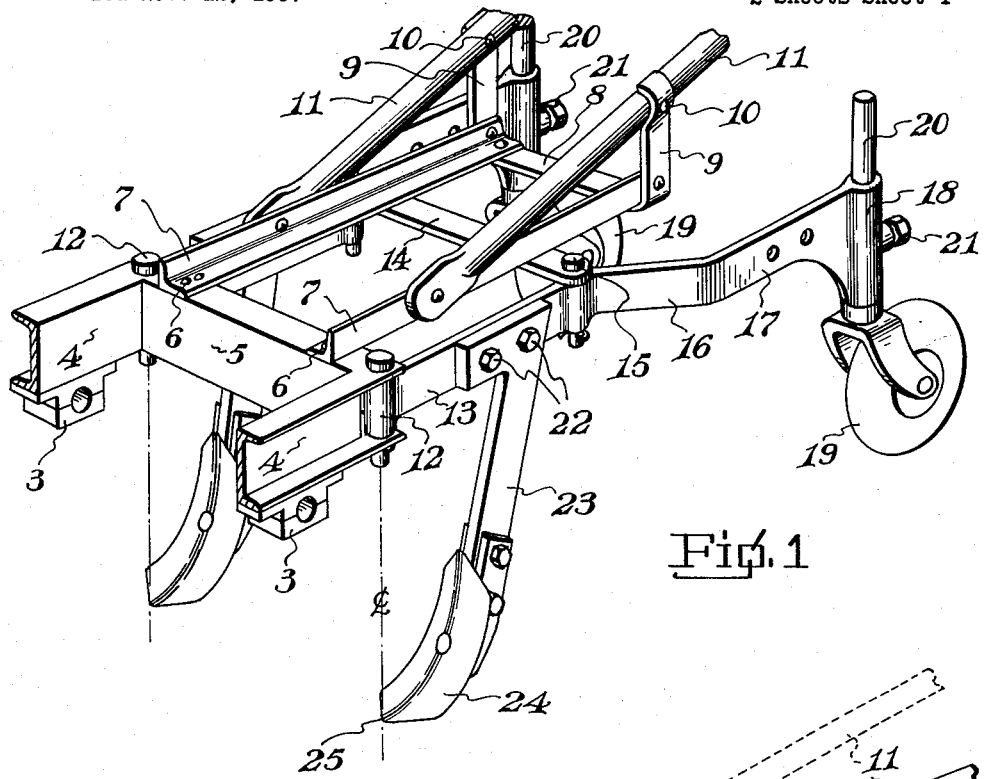
Figure 1 is a perspective view of the rear end of the rigid frame, showing the cultivator attached.
Figure 2:
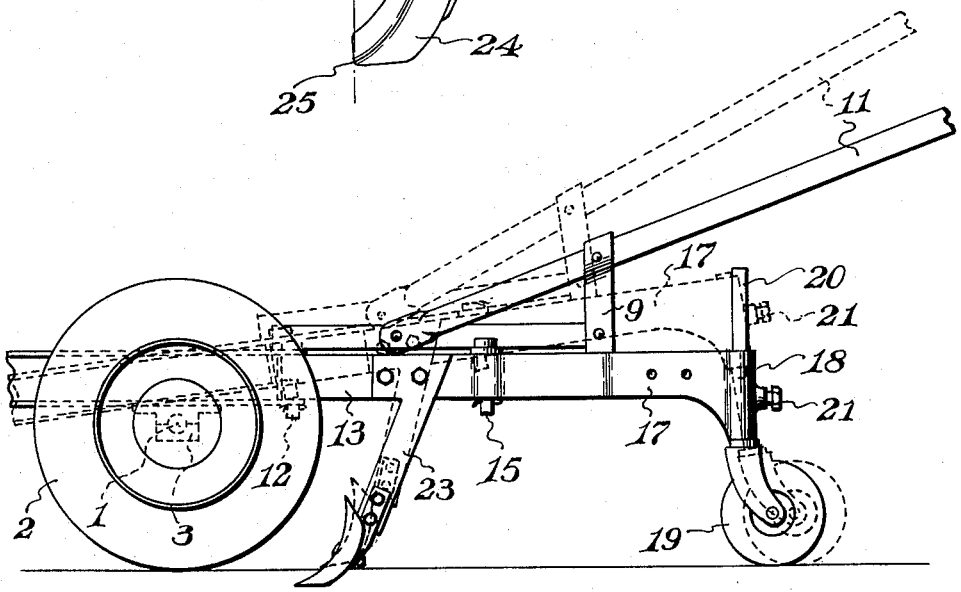
Figure 2 is a side elevation of Figure 1.

Referring to the drawings, the numeral 1 designates the axle of a tractor, for instance a two wheel tractor of the garden type, and 2 the ground engaging wheels driven by the tractor. Although a two wheeled tractor is shown, it is understood applicant does not limit himself in this respect.

In cultivators of the trailed type, now constructed, the parts are rigid, and there is a lateral swinging of the cultivator elements to either side as the tractor is guided along a row. The present device obviates this difficulty. Secured to the axle 1 by brackets 3 are arms 4, which arms extend rearwardly. The arms 4 are provided with a connecting bar 5, preferably parallel to the axle 1.

Rigidly secured at 6 to the bar 5 are rearwardly extending angle bars 7, the rear ends of which are connected together by U-shaped brackets 8, the arms 9 of which brackets extend upwardly and are anchored at 10 to the rearwardly and upwardly extending handle members 11, adapted to be grasped by the operator for steering the tractor. All of the frame above described is rigid and is rigidly secured to the axle, hence it will be seen that the two wheeled tractor can be guided to the right or the left.

Hingedly connected at 12 to the ends of the bar 5 are rearwardly extending cultivator beams 13. The cultivator beams 13, at points spaced from the hinged connection 12, are provided with a connecting link 14, the ends of which link are connected hingedly to the cultivator beams 13. To the rear of the hinged connections 15, the cultivator beams diverge outwardly as shown at 16 and terminate in rearwardly extending arms 17 in parallel relation. Mounted in sleeves 18 at the rear ends of the beam arms 17 are ground engaging wheels 19, which wheels are provided with upwardly extending shafts 20 extending through the sleeves 18. Wheels 19 are not caster wheels and are held against pivotal caster action by set screws 21 and in parallel relation as clearly shown in Figure 3.

Secured to opposite outer sides of the cultivator beams 13, at 22, are downwardly and forwardly extending plow arms 23, to the lower ends of which, are secured in the usual manner cultivator shoes 24. It will be noted that the points 25 of the cultivator shoes are in substantial alignment with the axis of the hinging points 12 of the cultivator beams to the rigid frame, the purpose of which will presently appear.

Referring to Figure 3, the operation is as follows, bearing in mind that the rigid frame including the handles 11 controls the guiding of the tractor which pulls the device, and that the cultivator shoes and beams will remain substantially in the same vertical longitudinal position in relation to the center of the row, as the tractor is guided from side to side. As the frame, controlling the tractor, is rigid, it will be seen that when the operator moves the handles 11 to the dotted line position shown in Figure 3, the wheels 2 will be guided to the right. During this movement the rear ends of the rigid frame as a whole will be swung to the left, and by so doing there is a slight retrograde movement of the right hand cultivator beam 13 and a slight advancement of the other cultivator beam as shown in dotted lines in Figure 3. Any lateral movement is neglible as will be noted in the dotted line change of position, and there will not be any side movement of the ground engaging wheels 19. This is made possible by the parallel movement incorporated in the mounting of the cultivator beams to the rigid frame, and the link connection 14 between the cultivator beams.

By placing the points 25, of the cultivator shovels, on the hinging points 12 of the cultivator beams the shovels will not materially interfere with the guiding of the tractor.

From the above it will be seen that a trailed cultivator is provided in connection with a pulling tractor and the tractor can be guided at will, ahead of the cultivator and the cultivator beams and elements will maintain a constant distance from opposite sides of the row of plants.

The invention having been set forth what is claimed as new and useful is:

In combination with a tractor having a rigid frame, means rigidly secured to the tractor frame and extending rearwardly therefrom whereby the tractor may be manually guided from the rear, a pair of frame members pivotally mounted on the rear of the rigid tractor frame for rotation about a first pair of spaced substantially vertical axes disposed one adjacent each side of the tractor frame, said frame members extending rearwardly from the tractor frame, rigid link means pivotally interconnecting said frame members a substantial distance to the rear of said first pair of axes and completing with said frame members and said rear of the tractor frame a parallelogram linkage articulated at its four corners about four spaced parallel substantially vertical axes, a cultitor element rigidly connected to each said frame member and extending forwardly downwardly to a lowermost point, said point of each said cultivator element lying on the adjacent one of said first pair of axes, and at least one ground-engaging wheel carried for rotation about a horizontal axis by at least one said frame member a substantial distance to the rear of said cultivator elements.

References Cited in the file of this patent

UNITED STATES PATENTS

| 1,811,175 | Donald | June 23, 1931 |
| 2,151,117 | Kepler | Mar. 21, 1939 |
| 2,322,268 | Zink et al. | June 22, 1943 |

FOREIGN PATENTS

| 75,260 | Denmark | Dec. 22, 1952 |